Jan. 16, 1951  R. E. KILLIP  2,538,316
EXPRESSING MACHINE
Filed May 31, 1944
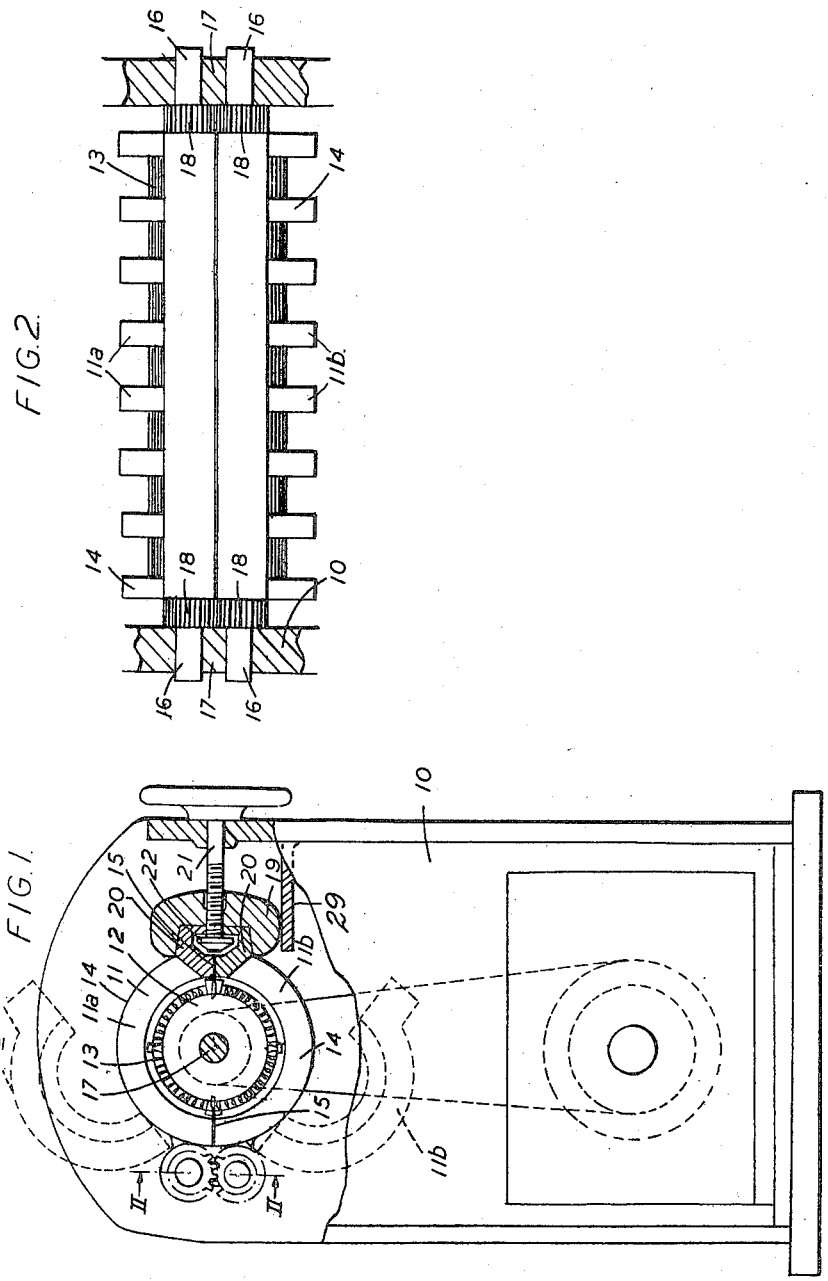
Robert E. Killip  Inventor
By
Attorney Patented Jan. 16, 1951

2,538,316

UNITED STATES PATENT OFFICE 2,538,316

EXPRESSING MACHINE

Robert Edward Killip, West Kirby, England, assignor to J. Bibby & Sons Limited, Liverpool, England, a British company Application May 31, 1944, Serial No. 538,146
In Great Britain June 1, 1943

1 Claim. (Cl. 100—48)

This invention is for improvements in or relating to expressing machines and is particularly concerned with a machine for expressing liquids such as oil from solids such as nut kernels.

The invention is concerned with expressing machines of the type (hereinafter referred to as the type specified) comprising a frame, a cage having pores or interstices in its wall and supported on said frame, and an extruding worm or impeller in said cage, the cage having an openable part or parts so as to provide access to the interior thereof for the purpose, for example, of relieving blockages or renewing or repairing the worm or any interior parts of the cage. Material to be treated is fed into the cage and is extruded therefrom through a restricted opening by the worm so that liquid matter in the material is expressed therefrom and exuded through the wall of the cage.

Due to the heavy stresses to which it is subjected the cage has to be made strong and heavy and heretofore dismantling and removal of a part or section of the cage to provide access to the interior thereof has been a necessarily heavy and laborious procedure. One object of the present invention is, therefore, to provide an expressing machine in which access can be gained to the interior of the cage easily and without involving the laborious lifting of the heavy movable part or section of the cage.

According to the present invention there is provided an expressing machine of the type specified characterised by a cage having at least one openable part provided with means tending to balance the weight of said openable part during movement thereof.

According to a further feature of the present invention there is provided an expressing machine of the type specified and having a cage comprising at least two openable parts, and means gearing said parts together so that during movement thereof one part tends to balance the weight of the other part.

According to a still further feature of the invention there is provided an expressing machine of the type specified and having a cage comprising two half-cylindrical parts, trunnions on each of said parts, means hinging said parts together, by said trunnions, at one side, a gear wheel on at least one trunnion of each part, the gear wheel of one part meshing with the gear wheel of the other part, whereby the weight of one part tends to balance the weight of the other part during opening and closing of the cage, and means for securing the two parts of the cage together at the side remote from the hinge.

The relative weights of the two parts of the casing may be made such that a relatively small effort only, if any effort at all, is required to open the cage when the clamp has been removed.

A specific embodiment of the invention will now be described by way of example with reference to the accompanying diagrammatic drawings. On the drawings:

Figure 1 is an end elevation of the machine with parts in section,

Figure 2 is a fragmentary sectional view on the line II—II of Figure 1.

The machine comprises a frame 10 supporting the cage 11 and provided with bearings for an impeller worm 12 by which the material from which the oil is to be expressed is forced through the hollow centre of the cage and extruded from one end thereof, the oil exuding through the walls of the cage. The material is fed from a hopper to the extruding worm by means of a feed worm. These feeding arrangements which are of conventional form are not shown on the drawing. The cage 11 comprises a draining surface of bars 13, having interstices between them through which the oil exudes under the pressure of the extruding worm on the material being treated, which are embraced by strong, spaced, circumferential bars 14. The cage is in two halves 11a and 11b, the division being in the mid-horizontal plane indicated at 15. Opposite ends of each half of the cage are provided with trunnions 16 journalled in strong bearings 17 on the frame 10 of the machine. At least two of the neighbouring trunnions of the respective halves each has a spur gear wheel 18 which is fixed on the trunnion and the two gear wheels mesh with one another. The trunnions 16 constitute hinges or pivots about which the cage opens and it will be seen that, because of the intermeshing gear wheels 18, the lower half 11b of the cage cannot fall to the open position without raising the upper half 11a as shown in dotted lines in Figure 1. Consequently if the two halves are of substantially equal weight only a small effort is necessary to swing the two halves apart and open the cage for the removal of the impeller worm 12 or removal, repair or cleaning of other interior parts such as the bars 13. In other words, the lower half of the cage constitutes a balance weight for the upper part. Similarly in closing the cage, the upper half acts as a balance weight to assist lifting of the lower part and only a small effort is required to close the cage.

The two halves 11a and 11b of the cage are secured together opposite the hinges 16, 17, so as to close the cage, by a clamping arrangement comprising a U section clamping bar 19 which extends from end to end of the cage and embraces wedge-shaped members 20 on the meeting edges of the two halves of the cage. Two hand operable screws 21 are journalled in the wall of the machine frame 10 and are threaded into the clamping bar 19, one towards one end and one towards the other, the inner ends of the screws each having a collar 22 which is embraced by the wedge members on the edges of the half sections of the cage when the cage is closed so as to limit axial movement of the screws. To secure the cage in the closed position the clamping bar, the interior of which is of wedge form to conform to the shape of the members 20 it embraces, is forced, by turning the screws 21 onto said members and this draws the two halves of the cage together. This method of securing the cage is an improvement on the general method of securing the halves of the cage together by a multiplicity of nuts and bolts all of which have to be removed when it is desired to open the cage. The wedge faces of the clamp and the members which it engages are designed so that very little force is required to secure the two halves of the cage firmly together. As the clamp is of heavy construction its weight may be taken on runners bars 29, only one bar being shown.

I claim:

An expressing machine of the type specified and including a cage having its axis arranged horizontally and comprising at least two parts opening relatively to each other on horizontal axes, a pivot for each part of the cage, means gearing the cage parts together so that during movement thereof one part tends to balance the weight of the other part, a readily releasable clamping bar for engaging the meeting edges of the cage for substantially the whole of the length thereof to secure the cage in the closed position, and means supporting said clamping bar for movement into and out of engagement with the cage.

ROBERT EDWARD KILLIP.

REFERENCES CITED

The following references are of record in the file of this patent:

UNITED STATES PATENTS

| Number | Name | Date |
|---|---|---|
| 422,064 | Bayles | Feb. 25, 1890 |
| 773,945 | Kronauer | Nov. 1, 1904 |
| 1,231,779 | Norris | July 3, 1917 |
| 1,588,668 | Fairchild | June 15, 1926 |
| 1,624,343 | Johnson | Apr. 12, 1927 |
| 1,709,349 | Hollstein | Apr. 16, 1929 |
| 1,908,659 | Cross | May 9, 1933 |